United States Patent
Minamiura

(10) Patent No.: US 8,236,436 B2
(45) Date of Patent: Aug. 7, 2012

(54) FUEL CELL SYSTEM AND HYDROGEN SUPPLY UNIT

(75) Inventor: Takeshi Minamiura, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 1002 days.

(21) Appl. No.: 12/153,393

(22) Filed: May 19, 2008

(65) Prior Publication Data

US 2008/0292914 A1  Nov. 27, 2008

(30) Foreign Application Priority Data

May 23, 2007 (JP) .................. 2007-137196

(51) Int. Cl.
*H01M 12/00* (2006.01)
(52) U.S. Cl. .......................................... 429/9
(58) Field of Classification Search .................. 429/9
See application file for complete search history.

(56) References Cited

U.S. PATENT DOCUMENTS

| | | | |
|---|---|---|---|
| 5,678,410 A | 10/1997 | Fujita et al. | |
| 6,638,650 B1 * | 10/2003 | Bailey et al. | 429/432 |
| 2006/0166060 A1 * | 7/2006 | Miura | 429/25 |

FOREIGN PATENT DOCUMENTS

| | | |
|---|---|---|
| JP | 55-156567 U | 11/1980 |
| JP | 04-121971 | 4/1992 |
| JP | 7-85883 | 3/1995 |
| JP | 08-315847 | 11/1996 |
| JP | 2001-351667 | 12/2001 |
| JP | 2002-161998 | 6/2002 |
| JP | 2006-019102 | 1/2006 |

OTHER PUBLICATIONS

Japanese Office Action, and English translation thereof, issued in Japanese Patent Application No. 2007-137196 dated Jun. 5, 2012.

* cited by examiner

*Primary Examiner* — Barbara Gilliam
*Assistant Examiner* — Gary Harris
(74) *Attorney, Agent, or Firm* — McDermott Will & Emery LLP

(57) ABSTRACT

A fuel cell system includes: a fuel cell which generates electricity using hydrogen and oxygen; a hydrogen storage which stores hydrogen supplied to the fuel cell and which has a supply port connectable to a hydrogen supply unit for supplying hydrogen from outside the fuel cell system; a detector which detects a leakage of the hydrogen from the hydrogen storage; and a connection controller which regulates connection of the hydrogen supply unit to the supply port when the leakage of the hydrogen is detected by the detector.

16 Claims, 10 Drawing Sheets

FUEL CELL SYSTEM AND HYDROGEN SUPPLY UNIT

CROSS-REFERENCE TO RELATED APPLICATIONS

This application is based upon and claims the benefit of priority from the prior Japanese Patent Application No. 2007-137196, filed on May 23, 2007, the entire contents of which are incorporated herein by reference.

BACKGROUND OF THE INVENTION

1. Field of the Invention

The present invention relates to a fuel cell for generating electricity using hydrogen and oxygen and a fuel cell system equipped with a hydrogen storage unit storing hydrogen to be supplied to the fuel cell. More particularly, the invention relates to a technology for controlling the supply of hydrogen to the hydrogen storage unit from outside.

2. Description of the Related Art

A fuel cell is a device that generates electricity from hydrogen and oxygen so as to obtain highly efficient power generation. A principal feature of a fuel cell is its capacity for direct power generation which does not undergo a stage of thermal energy or kinetic energy as in conventional power generation. This presents such advantages as high power generation efficiency despite the small scale setup, reduced emission of nitrogen compounds and the like, and environmental friendliness on account of minimal noise or vibration. A fuel cell is capable of efficiently utilizing chemical energy in its fuel and features environmental friendliness. Fuel cells are therefore envisaged as an energy supply system for the twenty-first century and have gained attention as a promising power generation system that can be used in a variety of applications including space applications, automobiles, mobile devices, and large and small scale power generation. Serious technical efforts are being made to develop practical fuel cells.

Hydrogen, which is fuel for such fuel cells, is gaseous at normal temperature. Hence, even when hydrogen being supplied to a fuel cell should leak at some point in the fuel cell system, a user may not often become aware of it, thus letting part of the hydrogen run to waste. Further, if the supply of hydrogen from outside the fuel cell system is kept on without the user noticing the abnormality of hydrogen leak, then a large amount of hydrogen will leak out and thus be wasted because the hydrogen is normally stored in a hydrogen supply unit under high pressure.

There have been various technologies proposed for preventing hydrogen leaks from a fuel cell system following the detection of the abnormality. In such conventional technologies, hydrogen leaks are typically controlled by the operation of an actuator that closes the valve of a hydrogen cylinder.

When a fuel cell is used as a power supply for a mobile device, it is required that the fuel cell system therefor be small-sized. Use of an actuator in such a fuel cell system tends to make the system structure more complex, thus making its downsizing difficult. Moreover, the drive power of the actuator is large, and therefore it is not desirable that an actuator be used in a fuel cell system for a mobile device.

SUMMARY OF THE INVENTION

The present invention has been made in view of the foregoing circumstances, and a general purpose thereof is to provide a technology for controlling the supply of hydrogen to a fuel cell system used for a portable device from outside in response to the detection of abnormality thereof.

One embodiment of the present invention relates to a fuel cell system. This fuel cell system comprises: a fuel cell which generates electricity using hydrogen and oxygen; a hydrogen storage which stores hydrogen supplied to the fuel cell and which has a supply port connectable to a hydrogen supply unit for supplying hydrogen from outside the fuel cell system; a detector which detects a leakage of the hydrogen from the hydrogen storage; and a connection controller which controls connection of the hydrogen supply unit to the supply port when the leakage of the hydrogen is detected by the detector.

Another embodiment of the present invention relates to a fuel cell system connected to a hydrogen supply unit including a hydrogen supply source for supplying additional hydrogen, a supply outlet connected to the fuel cell and a supply control means provided between the hydrogen supply source and the supply outlet. This fuel cell system comprises: a fuel cell which generates electricity using hydrogen and oxygen; a hydrogen storage which stores hydrogen supplied to the fuel cell and which has a supply port connectable to the hydrogen supply unit for supplying hydrogen from outside the fuel cell system; a detector which detects a leakage of the hydrogen from the hydrogen storage; and a structure deformation section provided in a position counter to the hydrogen supply unit, wherein when the leakage of the hydrogen is detected, the structure deformation section deforms a structure thereof.

Another embodiment of the present invention provides a hydrogen supply unit connectable to a fuel cell system including a fuel cell for generating electricity using hydrogen and oxygen and a hydrogen storage for storing the hydrogen. This hydrogen supply unit comprises: a hydrogen supply source which supplies hydrogen to the hydrogen storage; a supply outlet connected to the fuel cell system; and a supply control means provided between the hydrogen supply source and the supply outlet, wherein the supply control means includes: a movable part; and a supply control valve, and wherein when the hydrogen supply unit is connected to the fuel cell system and the movable part comes in contact with the fuel cell system and is moved thereby, the supply control valve closes so as to control supplying the hydrogen from the hydrogen supply source.

It is to be noted that any arbitrary combinations or rearrangement, as appropriate, of the aforementioned constituting elements and so forth are all effective as and encompassed by the embodiments of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 5B depicts schematically how a supply outlet of a hydrogen supply unit is joined to a supply port;

Figure 6A:
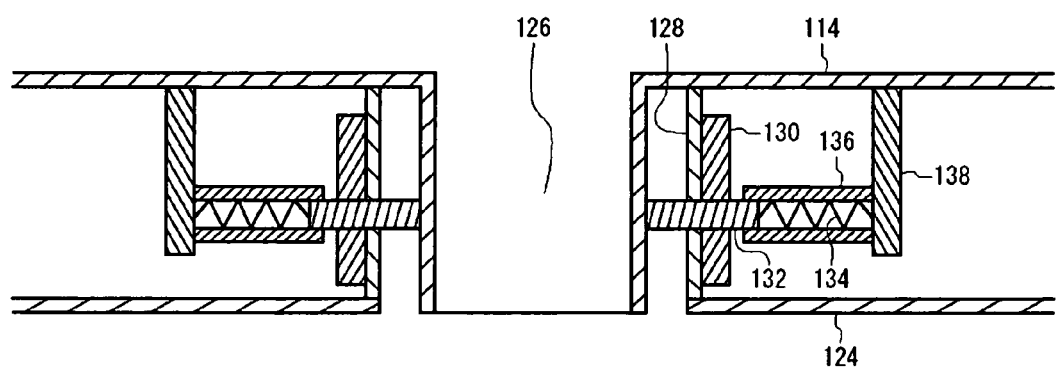
Figure 6B:
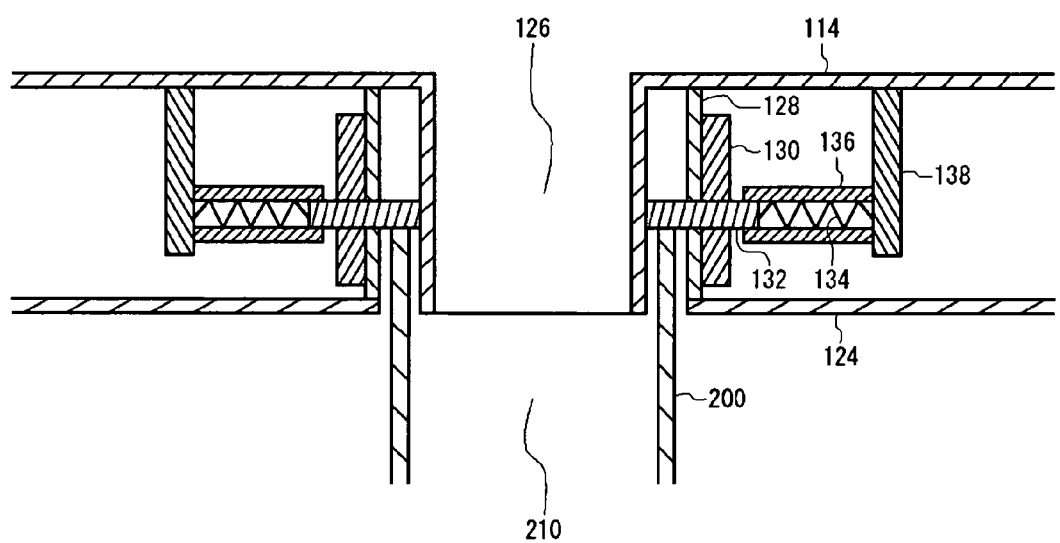
Figure 7A:
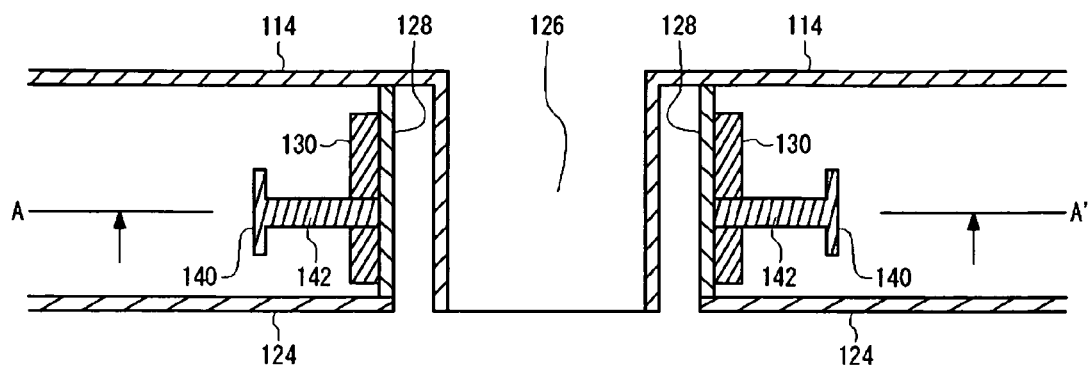
Figure 7B:
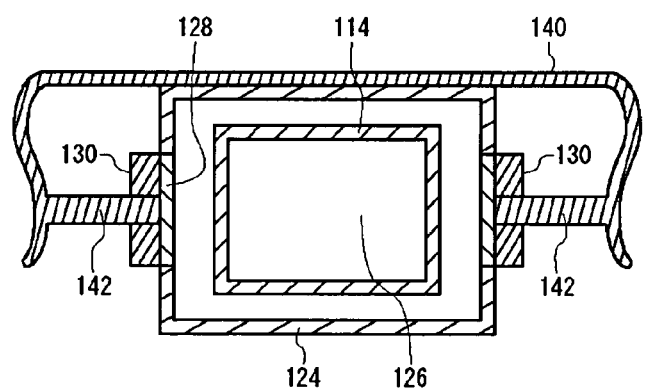
Figure 8A:
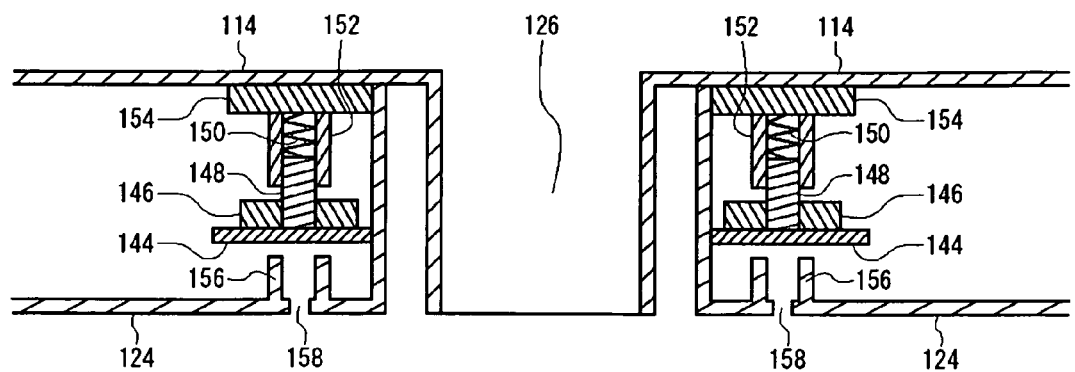
Figure 8B:
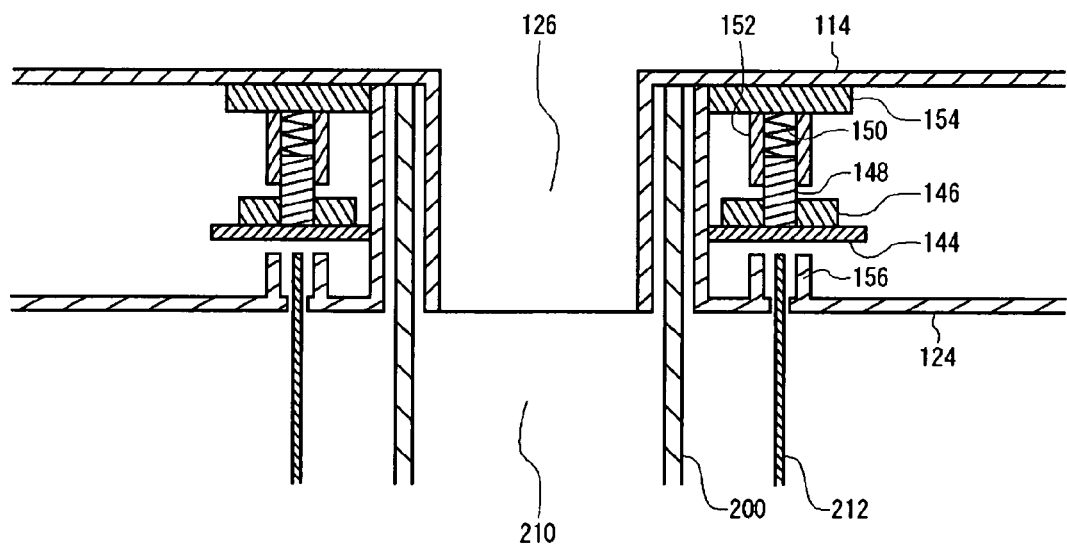
Figure 9A:
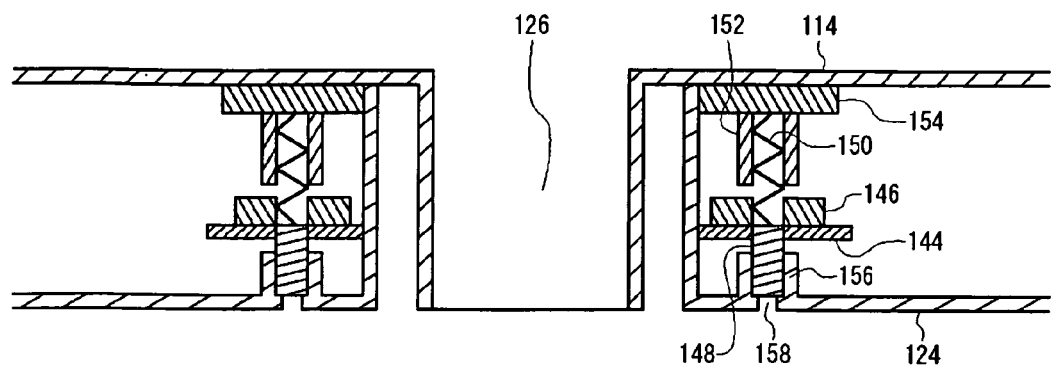
Figure 9B:
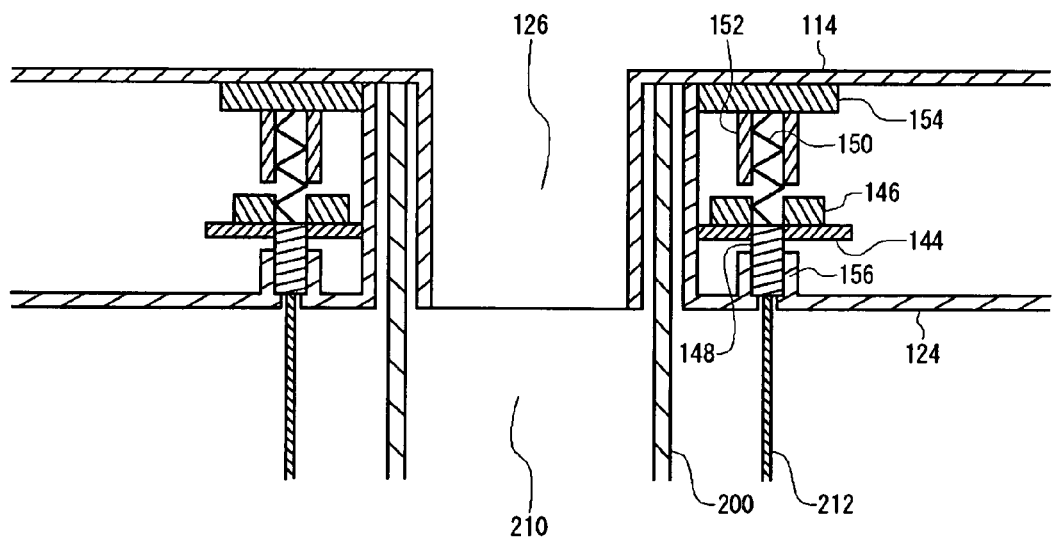
Figure 10:
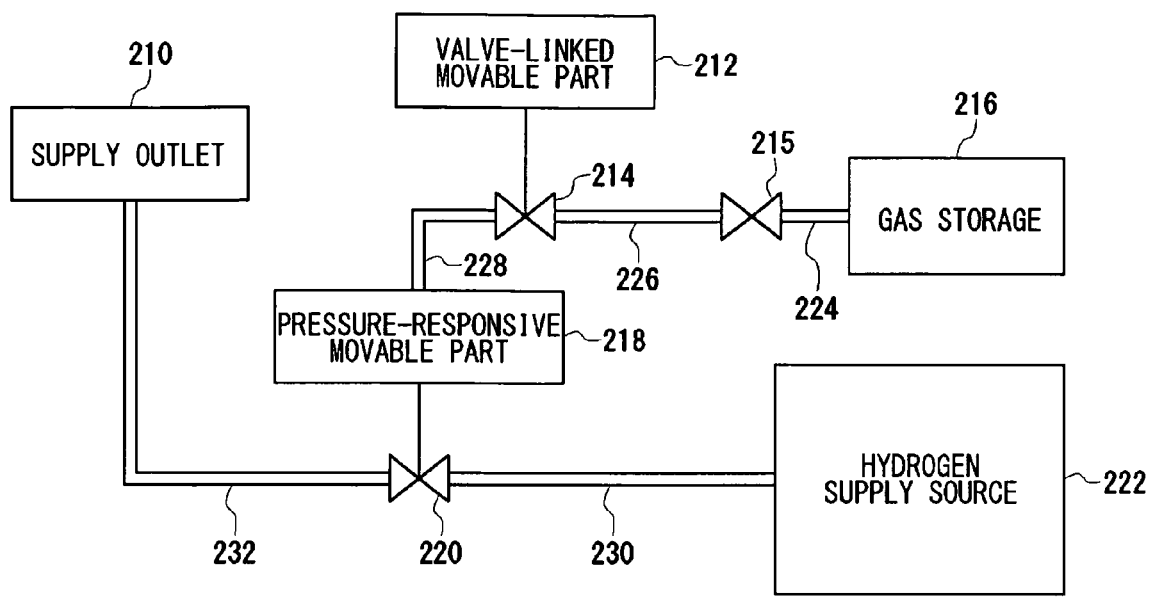

FIG. 6A depicts schematically a cross section of a connection control section after a movable part has moved; and FIG. 6B depicts schematically a state of a connection control section when a supply outlet is jointed after a movable part has moved;

FIG. 7A depicts schematically an enlarged cross section of a connection control section of a fuel cell system according to a second embodiment of the present invention; and FIG. 7B is a cross-sectional view of a cross section structure taken along line A-A' of FIG. 7A;

FIG. 8A depicts schematically an enlarged cross section of a structure deformation section of a fuel cell system according to a third embodiment of the present invention; and FIG. 8B depicts schematically how a supply outlet of a hydrogen supply unit is joined to a supply port;

FIG. 9A depicts schematically a cross section of a structure deformation section after a movable part has moved; and FIG. 9B depicts schematically a state of a structure deformation section when a supply outlet of a hydrogen supply unit is jointed after a movable part has moved; and FIG. 10 shows schematically a hydrogen supply unit corresponding to a fuel cell system according to a third embodiment of the present invention.

DETAILED DESCRIPTION OF THE INVENTION

The invention will now be described by reference to the preferred embodiments. This does not intend to limit the scope of the present invention, but to exemplify the invention.

The embodiments will now be described with reference to drawings.

Figure 1:
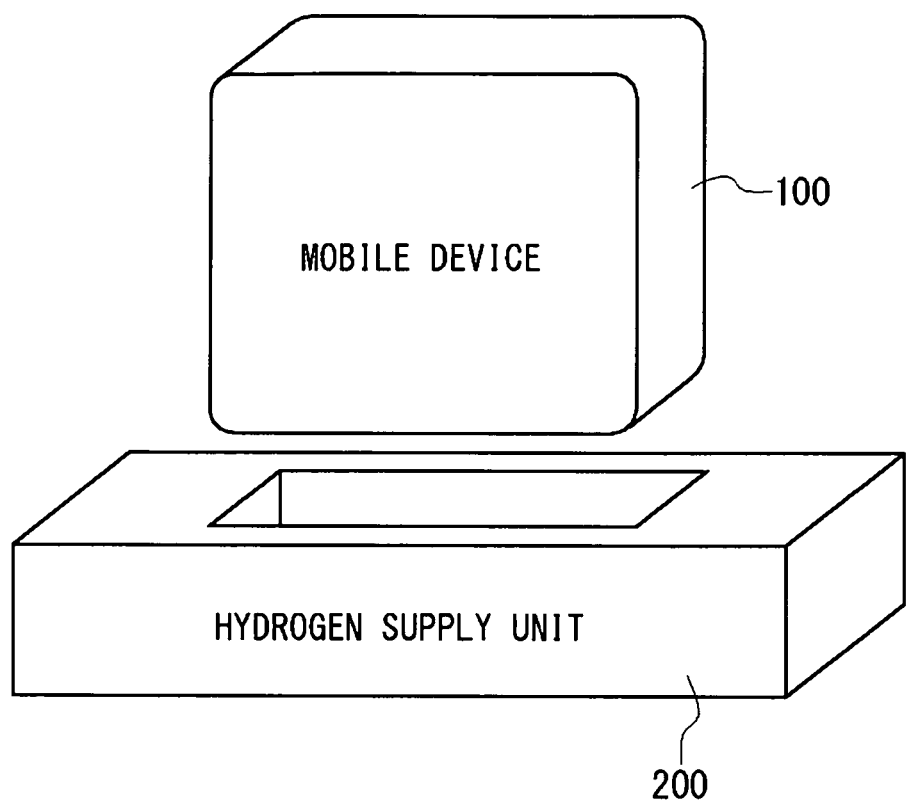
FIG. 1 schematically illustrates a mobile device, which is equipped with a fuel cell system, and a hydrogen supply unit, which supplies hydrogen to a metal hydride cartridge provided within the fuel cell system.

FIG. 1 is a schematic illustration showing a mobile device 100, which is equipped with a fuel cell system, and a hydrogen supply unit 200, which supplies hydrogen to a metal hydride cartridge (hereinafter referred to as "MH cartridge") provided within the fuel cell system. Note that a metal hydride may also be called a hydrogen storage alloy. Hydrogen is supplied to the MH cartridge when a user connects the mobile device 100 to the hydrogen supply unit 200 upon deciding that the hydrogen in the MH cartridge is running low or that the timing is right because the user is not taking the mobile device 100 out with him/her (e.g., during sleep).

Figure 2:
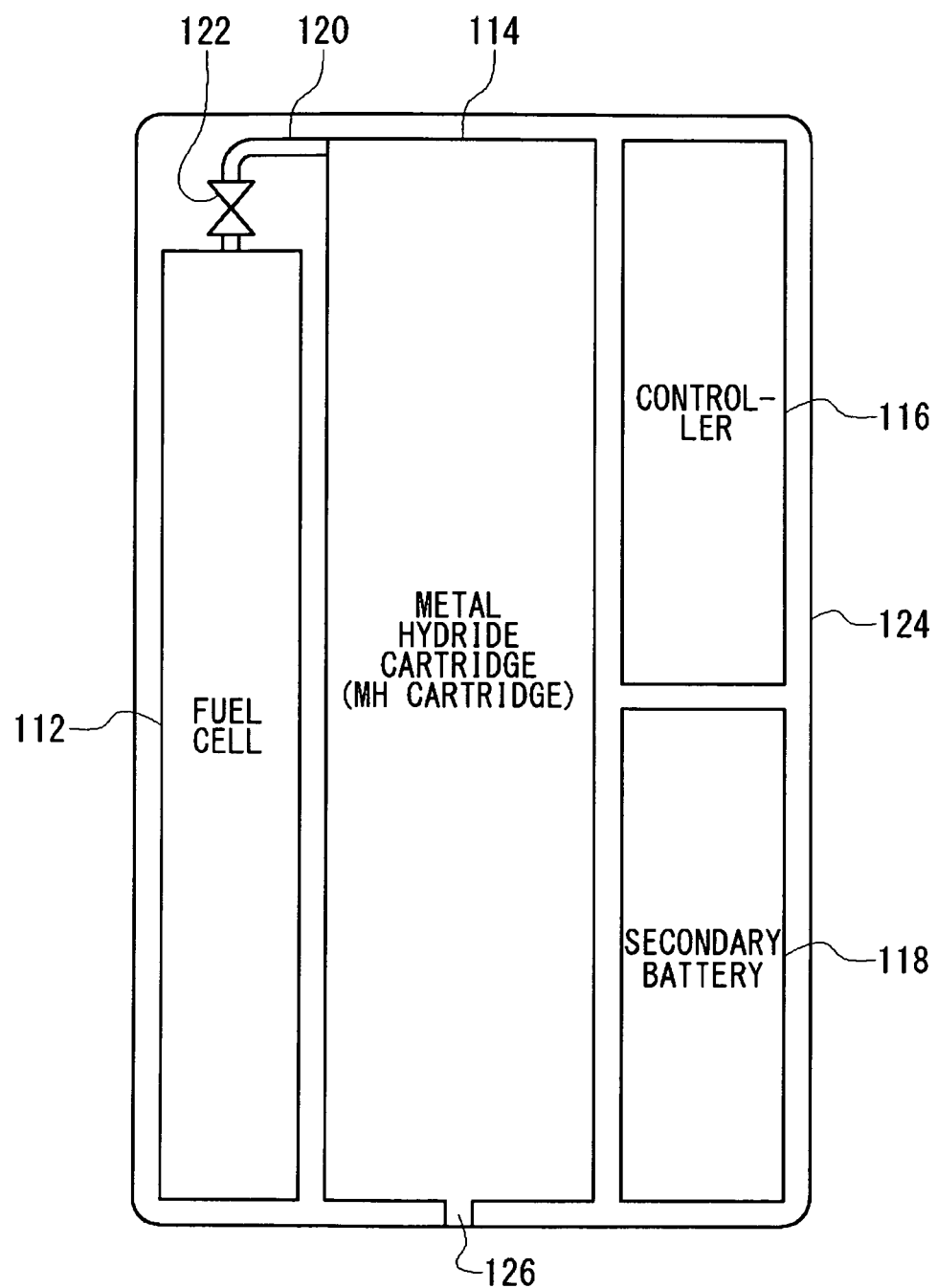
FIG. 2 schematically illustrates a fuel cell system installed in a mobile device.

FIG. 2 is a schematic illustration of a fuel cell system 110 installed in the mobile device 100. The fuel cell system 110 includes a fuel cell 112, an MH cartridge 114 for storing hydrogen to be supplied to the fuel cell 112, a controller 116, a secondary battery 118, a piping 120 for supplying the hydrogen in the MH cartridge 114 to the fuel cell 112, a valve 122 provided on the piping 120, and a housing 124 for housing the above-cited components.

The fuel cell 112, which is a fuel cell producing electricity using hydrogen and oxygen, may be either an active type or a passive type of fuel cell. The MH cartridge 114 holds a metal hydride therewithin. In the present embodiment, the metal hydride used is a rare-earth Mm (misch metal) $Ni_{4.32}Mn_{0.18}Al_{0.1}Fe_{0.1}Co_{0.3}$. However, the metal hydride is not limited to this alloy, but may include other alloy types, such as a La—Ni, Ti—Mn, Ti—Fe, Ti—Zr, Mg—Ni, or Zr—Mn type, for instance.

The controller 116 performs overall control of the fuel cell system 110, including the detection of leaks of hydrogen supplied from the MH cartridge 114 by controlling a not-shown measuring device. The valve 122 is operated to shut off the hydrogen being supplied from the MH cartridge 114 when the abnormality of the fuel cell 112 is detected. From the viewpoint of power saving, the shutting-off of hydrogen by the valve 122 may be effected by the user who manually closes the valve 122 upon receiving a warning of the abnormality of the fuel cell 112. The secondary battery 118 is charged with surplus power of the fuel cell 112. And it is the controller 116 that controls the charging and discharging of the secondary battery 118.

The MH cartridge 114 is provided with a supply port 126 which is connectable to a hydrogen supply unit used to supply hydrogen to the MH cartridge 114 from outside the fuel cell system 110. Provided near the supply port 126 is a connection control section or a structure deformation section, which is not shown. The connection control section and the structure deformation section will be discussed in detail later.

(Detection of Hydrogen Leak)

A hydrogen leak may occur due to damage to the electrolyte membrane in the fuel cell 112 or damage to the piping 120, for instance. In either case, the hydrogen mixes with air, and consequently the voltage of the fuel cell 112 lowers below a normal voltage level. Hence, the hydrogen leak can be detected as the controller 116 detects the voltage drop.

Cells constituting a fuel cell 112 are provided with at least one voltmeter in order to measure the voltage of the fuel cell 112. The arrangement may be such that multiple voltmeters may measure the voltages of their respective cells or a single voltmeter may measure the total voltage of a plurality of cells. The controller 116 detects a hydrogen leak by comparing the voltage measured by the voltmeter against the normal voltage. Alternatively, a predetermined value of normal voltage may be held by the controller 116, and the value may be compared with the cell voltage of the fuel cell 112.

The voltage of the fuel cell 112 may not be constant and may vary with the load even at normal times. Therefore, it is preferable that the open-circuit voltage (hereinafter referred to simply as "OCV") of the fuel cell 112 at normal times be compared with the OCV thereof at a hydrogen leak. The comparison of these two OCVs can realize more accurate detection of hydrogen leaks.

Figure 3:
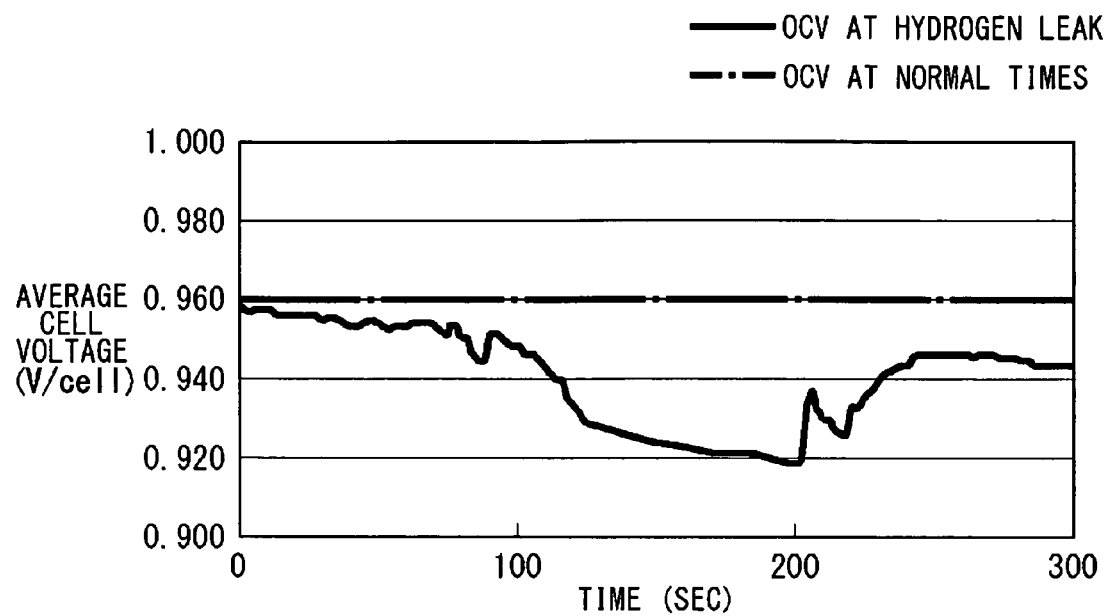
FIG. 3 is a graph showing an example of OCV changes occurring at a hydrogen leak and at normal times.

FIG. 3 is a graph showing an example of OCV changes occurring at a hydrogen leak and at normal times. The horizontal axis represents the time of measurement. The vertical axis represents the average voltage per unit cell calculated from voltage measurements of a plurality of cells. The graph of FIG. 3 indicates that the OCV at normal times is substantially constant. It also shows that the OCV at a hydrogen leak drops gradually with the lapse of time and begins to precipitously drop from around 100 seconds.

In FIG. 3, the OCV at a hydrogen leak drops about 4 percent. In response to this, the controller 116 may determine the presence of a hydrogen leak, for instance, when the OCV has dropped 2 percent with respect to the OCV at normal times. Or the controller 116 may determine a hydrogen leak when the fluctuation of OCV exceeds a predetermined value within a predetermined length of time. The use of these methods of determination enables distinguishing between voltage variation due to factors other than a hydrogen leak and voltage drops due to a hydrogen leak.

It is to be noted here that when the voltmeter measures the OCV of a cell or cells, power generation by the fuel cell 112 must be stopped. When the mobile device connected to the fuel cell system 110 is being used, it may be so arranged that the controller 116 instructs the user to stop the use of the mobile device and then checks for the presence of a hydrogen leak after the use of the mobile device is stopped.

As described above, the hydrogen leak can be detected by paying attention to a voltage drop of the fuel cell 112. However, the hydrogen leak may be detected by other methods, of which the details will be discussed hereinbelow. Besides such methods, a hydrogen detector (sensor) may be provided inside or outside the housing.

An MH cartridge 114 according to the present embodiment has a metal hydride therewithin. Generally speaking, the reaction of a metal hydride storage hydrogen is an exothermic reaction, whereas the reaction thereof releasing hydrogen is an endothermic reaction. In the event of a hydrogen leak, more hydrogen than at the normal operation of the fuel cell 112 is released from the MH cartridge. As a result, the temperature drop of the metal hydride is more conspicuous than at normal times, so that the temperature of the MH cartridge containing the metal hydride drops more than at normal times.

Figure 4:
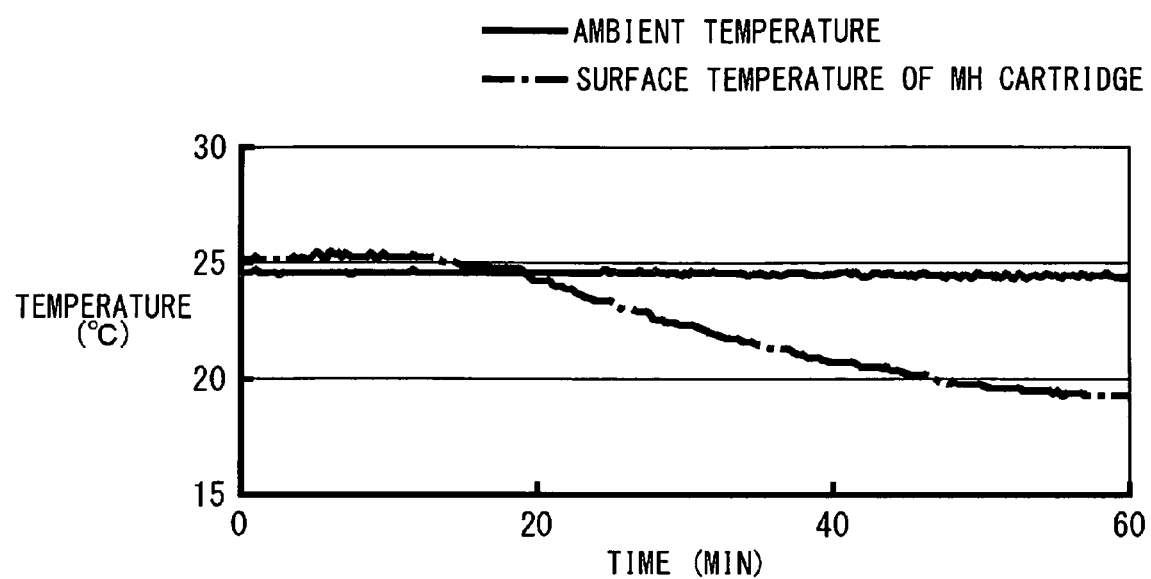
FIG. 4 is a graph showing changes in the surface temperature and the ambient temperature of a metal hydride cartridge when there has occurred a hydrogen leak in a fuel cell system.

FIG. 4 is a graph showing changes in the surface temperature and the ambient temperature of an MH cartridge 114 when there has occurred a hydrogen leak in a fuel cell system 110. The vertical axis represents the temperatures; and the horizontal axis the time of measurement. As the ambient temperature, the temperature of a region which is little affected by the heating from power generation by the fuel cell system 110 and the exothermic and endothermic reactions of the MH cartridge 114 is measured by a thermometer provided on the fuel cell system 110. When the fuel cell system 110 is operating normally without a hydrogen leak, the MH cartridge 114 is under the influence of heat coming from the fuel cell 112, so that the surface temperature of the MH cartridge 114 does not drop in a short time, as shown in FIG. 4.

Accordingly, the controller 116 can detect a hydrogen leak by comparing the temperature measured by the thermometer for measuring the surface temperature of the MH cartridge 114 against the temperature measured by the thermometer for measuring the ambient temperature. For example, a hydrogen leak can be determined when the surface temperature of the MH cartridge 114 has dropped in excess of a predetermined rate relative to the ambient temperature.

First Embodiment

Figure 5A:
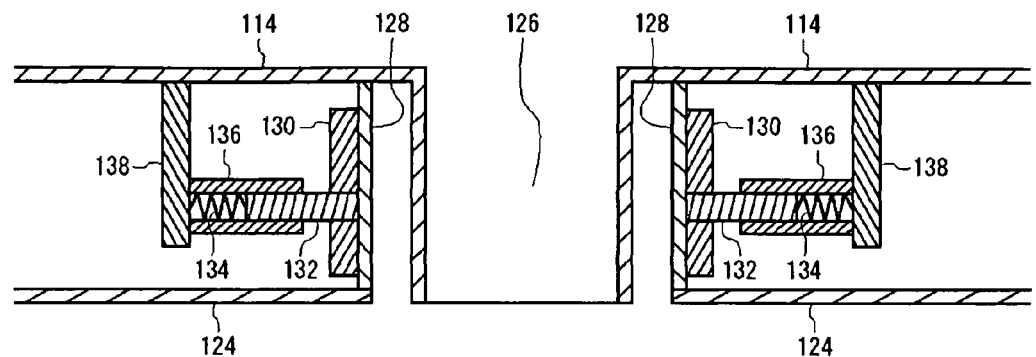
FIG. 5A depicts schematically an enlarged cross section of connection control section of a fuel cell system according to a first embodiment of the present invention.

FIG. 5A depicts schematically an enlarged cross section of connection control section of a fuel cell system 110 according to a first embodiment of the present invention. The connection control section is provided near the supply port 126 of the MH cartridge 114. The connection control section includes a thermoplastic part 128, a heat-generating part 130, a movable part 132, an elastic part 134, a movable part holder 136, and a support 138, which are all provided in pairs.

The thermoplastic part 128 is disposed in parallel with a sidewall of the supply port 126. The heat-generating part 130 is disposed in contact with the thermoplastic part 128 to conduct the heat generated to the thermoplastic part 128. The heat-generating part 130, which is connected to a not-shown secondary battery 118, generates heat using electric power from the secondary battery 118. An example of the heat-generating part 130 may be a member capable of generating heat by resistive heating. When the electric power used by the heat-generating part 130 is taken into consideration, the material for the thermoplastic part 128 is preferably one having a low melting point, such as polyethylene or polystyrene.

The movable part 132 is disposed in such a manner that it is pressed against the thermoplastic part 128 by the action of the elastic part 134 (e.g., a spring or rubber). The movable part 132 is pressed inward in the direction of a sidewall of the supply port 126. The movable part 132 and the elastic part 134 are both held by the movable part holder 136 of a cylindrical shape. The movable part holder 136 is supported by the support 138 which is fixed to the MH cartridge 138.

Figure 5B:
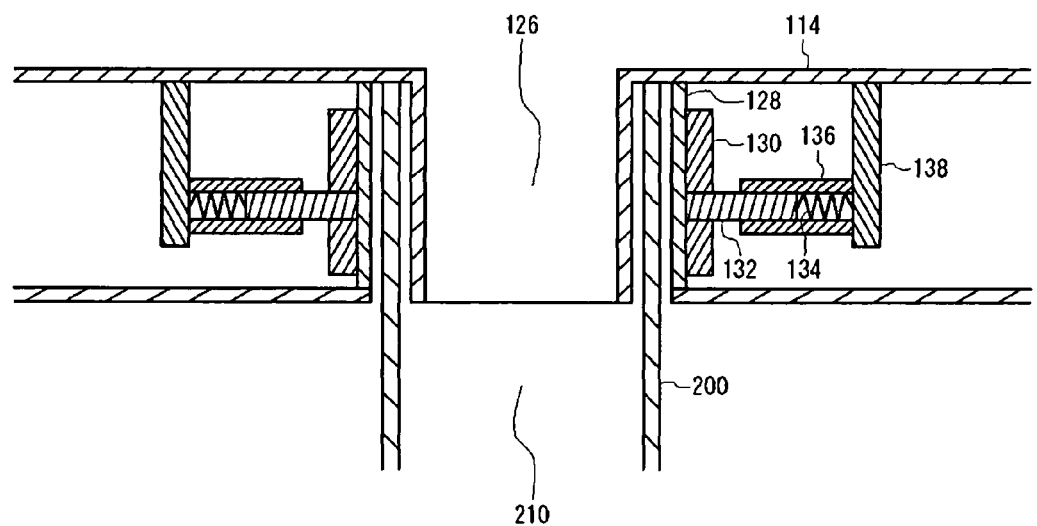

FIG. 5B depicts schematically how a supply outlet 210 of a hydrogen supply unit 200 is joined to the supply port 126. The supply outlet 210 of the hydrogen supply unit 200 is inserted into a space between the sidewall of the supply port 126 and the thermoplastic part 128 (hereinafter referred to simply as "connection space"), and thus it is connected to the MH cartridge 114 and in communication with the supply port 126. Hence, when the supply outlet 210 is joined to the supply port 126, the sidewall of the supply outlet 210 inserted in the connection space is facing the thermoplastic part 128.

As described above, the supply outlet 210 of the hydrogen supply unit 200 is connected to the supply port 126 of the MH cartridge 114, and hydrogen is supplied from the hydrogen supply unit 200 to the MH cartridge 114.

FIG. 6A depicts schematically a cross section of a connection control section after the movable part 132 has moved. Upon detection of a hydrogen leak, the controller 116 causes the secondary battery 118 to send electric power to the heat-generating part 130. The thermoplastic part 128 is softened by the heat coming from the heat-generating part 130. At the point when the softened thermoplastic part 128 yields to the pressure from the movable part 132, the movable part 132 passes through the thermoplastic part 128. The movable part 132 having penetrated therethrough protrudes into the connection space and comes to a halt in contact with the sidewall of the supply port 126. FIG. 6A shows this state.

FIG. 6B depicts schematically the state of a connection control section when an attempt is made to connect the supply outlet 210 after the movable part 132 has moved. If an attempt is made to connect the supply outlet 210 to the supply port 126 with the movable part 132 protruding into the connection space and in contact with the sidewall of the supply port 126, an leading end of the sidewall of the supply outlet 210 will come into collision with the movable part 132. As a result, the supply outlet 210 cannot be connected to the supply port 126, thus making it impossible to supply hydrogen from the hydrogen supply unit 200 to the MH cartridge 114.

The arrangement as described above does not allow the user to connect his/her mobile device 100 to the hydrogen supply unit 200. Even when the user is not aware of a hydrogen leak, the hydrogen being supplied from the hydrogen supply unit 200 to the MH cartridge 114 can be prevented from leaking in a large amount from the point of leak.

Such a connection control mechanism as described above is simple, so that it may contribute to the downsizing of the system incorporating it and the reduction of power consumption thereby. Hence, such a mechanism is desirable for use in mobile devices. It is conceivable that such a connection control mechanism is created by an additional machining process applied to the MH cartridge 114. However, in consideration of high strength required of the MH cartridge 114 which stores hydrogen under high pressure, it is not advisable to apply an additional machining process thereto. Therefore, the fuel cell system 110 can be equipped with a connection control mechanism more easily by providing a separate connection control section near the supply port 126.

Second Embodiment

FIG. 7A depicts schematically an enlarged cross section of a connection control section of a fuel cell system 110 according to a second embodiment of the present invention. FIG. 7B is a cross-sectional view of a cross section structure taken along line A-A' of FIG. 7A. In the description of the connection control section according to the second embodiment, the repeated description of the structure identical to that of the first embodiment will be omitted as appropriate, and only the features and structure different from the connection control section according the first embodiment will be explained.

The connection control section includes a thermoplastic part 128, a heat-generating part 130, and a plate spring 140, which are all provided in pairs. The plate spring 140 is provided with a protruding part 142. A pair of protruding parts 142 is so disposed that they are oriented inward from both sides of the supply port 126 and the supply port 126 is pitched between them. The projecting part 142 is pressed against the thermoplastic part 128 by the elastic force of the plate spring 140. Here, the protruding part 142 is described as part of the plate spring 140, but the protruding part 142 and the plate spring 140 may be separate bodies from each other.

Upon detection of a hydrogen leak, the controller 116 causes the secondary battery 118 to send electric power to the heat-generating part 130, thereby softening the thermoplastic part 128. At the point when the softened thermoplastic part 128 yields to the pressure from the protruding part 142, the protruding part 142 passes through the thermoplastic part 128. The protruding part 142 having penetrated therethrough protrudes into the connection space and comes to a halt in contact with the sidewall of the supply port 126.

If an attempt is made to connect the supply outlet 210 of the hydrogen supply unit 200 to the supply port 126 with the protruding part 142 protruded into the connection space and in contact with the sidewall of the supply port 126, the leading end of the sidewall of the supply outlet 210 will come into collision with the protruding part 142. As a result, the supply outlet 210 cannot be connected to the supply port 126. This makes it impossible to supply the hydrogen from the hydrogen supply unit 200 to the MH cartridge 114. In other words, the structure of the second embodiment can also provide the same advantageous effect as that of the first embodiment.

Third Embodiment

Thus far, a description has been given of arrangements for forcibly controlling the supply of hydrogen by providing a fuel cell system 110 with a mechanism for controlling the connection of a hydrogen supply unit 200 thereto. Next, a description will be given of a mechanism for forcibly controlling the supply of hydrogen by closing a valve on a hydrogen supply source within the hydrogen supply unit 200 without controlling the connection thereof.

FIG. 8A depicts schematically an enlarged cross section of a structure deformation section of a fuel cell system 110 according to a third embodiment of the present invention. The structure deformation section is provided near the supply port 126 in the similar manner to the connection control section of the first and second embodiments. In the description of the structure deformation section according to the third embodiment, the repeated description of the structure identical to that of the first embodiment will be omitted as appropriate, and only the features and structure different from the structure deformation section according the first embodiment will be explained.

The structure deformation section includes a thermoplastic part 144, a heat-generating part 146, a movable part 148, an elastic part 150, a movable part holder 152, and a support 154, which are all provided in pairs. The thermoplastic part 144 is disposed in an orientation perpendicular to the sidewall of the supply port 126. The heat-generating part 146 is disposed in contact with the thermoplastic part 144 to conduct the heat generated to the thermoplastic part 144.

The movable part 148 is disposed in such a manner that it is pressed against the thermoplastic part 144 by the action of the elastic part 150. The movable part 148 is also pressed in the direction of the sidewall of the supply port 126. That is, the movable part 148 is pushed downward along the sidewall of the supply port 126. The movable part 148 and the elastic part 150 are both held by the movable part holder 152 of a cylindrical shape. The movable part holder 152 is supported by the support 154 which is fixed to the MH cartridge 114. The housing 124 is provided with a cylindrical projection 156 and an opening 158.

FIG. 8B depicts schematically how a supply outlet 210 of a hydrogen supply unit 200 is joined to the supply port 126. The supply outlet 210 of the hydrogen supply unit 200 is inserted into the space between the sidewall of the supply port 126 and the part of the housing 124 facing the sidewall thereof (hereinafter referred to simply as "connection space"), and thus it is connected to the MH cartridge 114 and in communication with the supply port 126. Hence, when the supply port 126 is joined to the supply outlet 210, the sidewall of the supply outlet 210 inserted in the connection space is facing the structure deformation section with the part of the housing 124 present therebetween.

As described above, the supply outlet 210 of the hydrogen supply unit 200 is connected to the supply port 126 of the MH cartridge 114, and hydrogen is supplied from the hydrogen supply unit 200 to the MH cartridge 114.

The hydrogen supply unit 200 used in the third embodiment is provided with a valve-linked movable part 212. When the hydrogen supply unit 200 is connected to the MH cartridge 114, the valve-linked movable part 212 passes through the opening 158 and advances into the interior of the housing 124. In other words, the opening 158 is provided in the housing 124 to allow the valve-linked movable part 212 to pass therethrough when the hydrogen supply unit 200 is connected to the MH cartridge 114.

FIG. 9A depicts schematically a cross section of a structure deformation section after the movable part 148 thereof has moved. Upon detection of a hydrogen leak, the controller 116 causes the secondary battery 118 to send electric power to the heat-generating part 146, thereby softening the thermoplastic part 144. At the point when the softened thermoplastic part 144 yields to the pressure from the movable part 148, the movable part 148 passes through the thermoplastic part 144 and advances into the cylindrical projection 156.

The opening area of the opening 158 is smaller than the inner cross-sectional area of the cylindrical projection 156 and also smaller than the cross-sectional area of the movable part 148. Therefore, the movable part 148, after advancing into the cylindrical projection 156, comes to a halt in contact with the housing 124. FIG. 9A shows this state. The cylindrical projection 156 is provided on the housing 124 so that it can pass through the thermoplastic part 144 and then the movable part 148 can advance into the projection 156.

FIG. 9B depicts schematically a state in which the supply outlet 210 of the hydrogen supply unit 200 is connected to the supply port 126 of the MH cartridge 114 after the movable part 148 of the structure deformation section has moved. Without obstruction in the connection space unlike the case of the first and second embodiments, the supply outlet 210 can be readily connected to the supply port 126. However, if the movable part 148 having advanced into the cylindrical projection 156 is in contact with the housing 124, an attempt to have the valve-linked movable part 212 enter into the opening 158 will result in the tip of the valve-linked movable part 212 colliding with the tip of the movable part 148. In consequence, the valve-linked movable part 212 will be pushed downward.

FIG. 10 shows schematically a hydrogen supply unit 200 corresponding to a fuel cell system 110 according to the third embodiment. The hydrogen supply unit 200 includes a supply outlet 210, a hydrogen supply source 222, and a supply control means. The hydrogen supply source 222 supplies hydrogen which is to be sent to the MH cartridge 114 by way of the supply outlet 210. The hydrogen supply source 222 may be a component member storing hydrogen or may be a means to which hydrogen is supplied from outside the system as with city gas. The supply outlet 210, as have been described, is connected to the supply port 126 of the fuel cell system 110.

The supply control means is provided between the supply outlet 210 and the hydrogen supply source 222. The supply control means shuts off hydrogen supplied from the hydrogen supply source 222 in response to the motion of a valve-linked movable part 212. The supply control means includes a valve-linked movable part 212, a valve 214, a valve 215, a gas storage 216, a pressure-responsive movable part 218, a valve 220 and a piping connecting these component members.

The valve 214 opens and closes in association with the motion of the valve-linked movable part 212. An adjustment is made in such a manner that the valve 214 closes when the valve-linked movable part 212 is not in contact with the movable part 148 and opens when the valve-linked movable part 212 is pushed down by the movable part 148. The gas storage 216 discharges gas into piping 226 and piping 228 by way of the valve 215.

The gas storage 216 may be a small gas cylinder or the like, and the gas inside the gas storage 216 is maintained at a pressure higher than the pressure of gas outside (hereinafter referred to simply as "external pressure"). Accordingly, the piping 226 and the piping 228 contain a gas at a pressure higher than the external pressure. Note that the external pressure is equal to the atmospheric pressure near the valve 214.

The pressure-responsive movable part 218 opens or closes the valve 220 in response to the pressure given by the gas inside the piping 228. An adjustment is made in such a manner that the valve 220 opens when the pressure applied is higher than the external pressure and closes when it is equal to the external pressure. It is to be noted that a set of valve-linked movable part 212 and valve 214 and a set of valve-responsive movable part 218 and valve 220, which are both represented as separate bodies in FIG. 10, may be both formed integrally with each other.

The piping 224 connects the gas holder 216 and the valve 215. The piping 226 connects the valve 215 and the valve 214. The piping 228 connects the valve 214 and the pressure-responsive movable part 218. The piping 230 connects the hydrogen supply source 222 and the valve 220. The piping 232 connects the valve 220 and the supply outlet 210.

As explained by referring to FIG. 9B, in the event of a hydrogen leak in the fuel cell system 110, the movable part 148 advances into the cylindrical projection 156. Then, as the mobile device 100 is connected to the hydrogen supply unit 200, the valve-linked movable part 212 of the hydrogen supply unit 200 is pushed down to open the valve 214. With the valve 214 opened, the gas inside the piping 226 and the piping 228 is released outside, and thus the pressure inside the piping 226 and the piping 228 is equalized with the external pressure.

The drop of pressure in the piping 226 and the piping 228 sets the pressure-responsive movable part 218 in motion. As a result, the valve 220 is closed, and the hydrogen being supplied from the hydrogen supply source 222 is shut off by the valve 220.

To start the supply of hydrogen from the hydrogen supply source 222 to the MH cartridge 114 of the fuel cell system 110 again, the following procedure is used.

First the mobile device 100 is removed from the hydrogen supply unit 200, and then the valve-linked movable part 212 is returned to the original position to close the valve 214. Following this, the valve 215 is opened to supply a high-pressure gas into the piping 226 and the piping 228 from the gas storage 216. After the supply of this gas, the valve 215 is closed. As the pressure inside the piping 226 and the piping 228 becomes higher than outside, the pressure-responsive movable part 218 is set in motion to open the valve 220. Thus, the supply of hydrogen is again possible.

The arrangement and processing as described above allow forcibly shutting off the supply of hydrogen to the fuel cell system 11 even when the user is not aware of the presence of a hydrogen leak in the fuel cell system 110. Hence, prevented is the leak of hydrogen in a large amount when the mobile device 100 is connected to the hydrogen supply unit 200.

The mechanism as described above is simple, so that it may contribute to the downsizing of the system incorporating it and the reduction of power consumption thereby. Hence, such a mechanism is desirable for use in mobile devices. It is also conceivable that such a structural deformation mechanism is created by an additional forming process applied to the MH cartridge 114. However, in consideration of high strength required of the MH cartridge 114 which stores hydrogen under high pressure, it is not advisable to apply an additional forming process thereto. Thus it is possible to shut off the supply of hydrogen easily by providing a separate structural deformation mechanism near the supply port 126.

In the first and second embodiments, there is provided a mechanism to control the connection of the hydrogen supply unit 200 to the fuel cell system 110. In the third embodiment, on the other hand, the supply of hydrogen is shut off by a cooperatively associated operation of mechanisms provided on both the fuel cell system 110 and the hydrogen supply unit 200. Therefore, there needs to be exact compatibility between the hydrogen supply unit 200 and the mobile device 100, which can prevent the user from getting involved in a mechanical failure or unexpected accident resulting from the use of a similar product to the hydrogen supply unit 200.

The present invention is not limited to the above-described embodiments only, and it is understood by those skilled in the art that various modifications such as changes in design may be made based on their knowledge and the embodiments added with such modifications are also within the scope of the present invention.

In the foregoing embodiments, a heat-generating part is provided around a movable part in such a manner that it is in contact with a thermoplastic part. However, the heat-generating part may be provided at the leading end of the movable part that comes in contact with the thermoplastic part, so that the movable part may pass through the thermoplastic part more easily.

Also, in the foregoing embodiments, hydrogen is supplied by connecting the hydrogen supply unit to the mobile device as shown in FIG. 1. However, the arrangement may be such that only the fuel cell system which is removably attached to the mobile device is removed from the mobile device and connected to the hydrogen supply unit.

Further, in the foregoing embodiments, electric power to be supplied to the heat-generating part is supplied from the secondary cell. However, it may be supplied from the primary battery, instead of the secondary cell.

While the preferred embodiments of the present invention and the modifications to the embodiments have been described using specific terms, such description is for illustrative purposes only, and it is to be understood that changes and variations may be further made without departing from the spirit or scope of the appended claims.

What is claimed is:

1. A fuel cell system configured to be attached to a hydrogen supply unit to supply hydrogen from the hydrogen supply unit to the fuel cell system, comprising:

a fuel cell which generates electricity using hydrogen and oxygen;

a hydrogen storage which stores hydrogen supplied to said fuel cell and which has a supply port connectable to a hydrogen supply unit for supplying hydrogen from outside the fuel cell system;

a detector which detects a leakage of the hydrogen from said hydrogen storage; and a connection controller which prevents connection of the hydrogen supply unit to the supply port when the leakage of the hydrogen is detected by said detector.

2. A fuel cell system according to claim 1 further comprising a primary cell or a secondary cell, said connection controller including:

a thermoplastic part;

a heat-generating part which generates heat and conducts the heat generated to the thermoplastic part; and a movable part which is pressed against the thermoplastic part by an elastic part, wherein when a leakage of hydrogen is detected, the thermoplastic part is softened by supplying electric power from the primary cell or the secondary cell to the heat-generating part, and the movable part is operated.

3. A fuel cell connected to a hydrogen supply unit including a hydrogen supply source for supplying additional hydrogen, a supply outlet connected to the fuel cell and a supply control means provided between the hydrogen supply source and the supply outlet, the fuel cell system comprising:

a fuel cell which generates electricity using hydrogen and oxygen;

a hydrogen storage which stores hydrogen supplied to said fuel cell and which has a supply port connectable to the hydrogen supply unit for supplying hydrogen from outside the fuel cell system;

a detector which detects a leakage of the hydrogen from said hydrogen storage; and a structure deformation section provided in a position counter to the hydrogen supply unit, wherein when the leakage of the hydrogen is detected, said structure deformation section deforms a structure thereof.

4. A fuel cell system according to claim 3, further comprising a primary cell or a secondary cell, said structure deformation section including:

a thermoplastic part;

a heat-generating part which generates heat and conducts the heat generated to the thermoplastic part; and a movable part which is pressed against the thermoplastic part by an elastic part, wherein when a leakage of hydrogen is detected, the thermoplastic part is softened by supplying electric power from the primary cell or the secondary cell to the heat-generating part, and the movable part is operated.

5. A fuel cell system according to claim 1, wherein said detector includes a voltmeter which measures the voltage of cells constituting the fuel cell, and detects the leakage of the hydrogen supplied from said hydrogen storage by comparing a measured voltage value with a predetermined voltage value.

6. A fuel cell system according to claim 2, wherein said detector includes a voltmeter which measures the voltage of cells constituting the fuel cell, and detects the leakage of the hydrogen supplied from said hydrogen storage by comparing a measured voltage value with a predetermined voltage value.

7. A fuel cell system according to claim 3, wherein said detector includes a voltmeter which measures the voltage of cells constituting the fuel cell, and detects the leakage of the hydrogen supplied from said hydrogen storage by comparing a measured voltage value with a predetermined voltage value.

8. A fuel cell system according to claim 4, wherein said detector includes a voltmeter which measures the voltage of cells constituting the fuel cell, and detects the leakage of the hydrogen supplied from said hydrogen storage by comparing a measured voltage value with a predetermined voltage value.

9. A fuel cell system according to claim wherein said hydrogen storage includes a metal hydride, and wherein said detector includes a first thermometer for measuring the temperature of said hydrogen storage and a second thermometer for measuring ambient temperature, and said detector detects the leakage of the hydrogen supplied from said hydrogen storage by comparing a temperature value measured by the first thermometer with that measured by the second thermometer.

10. A fuel cell system according to claim 2, wherein said hydrogen storage includes a metal hydride, and wherein said detector includes a first thermometer for measuring the temperature of said hydrogen storage and a second thermometer for measuring ambient temperature, and said detector detects the leakage of the hydrogen supplied from said hydrogen storage by comparing a temperature value measured by the first thermometer with that measured by the second thermometer.

11. A fuel cell system according to claim 3, wherein said hydrogen storage includes a metal hydride, and wherein said detector includes a first thermometer for measuring the temperature of said hydrogen storage and a second thermometer for measuring ambient temperature, and said detector detects the leakage of the hydrogen supplied from said hydrogen storage by comparing a temperature value measured by the first thermometer with that measured by the second thermometer.

12. A fuel cell system according to claim 4, wherein said hydrogen storage includes a metal hydride, and wherein said detector includes a first thermometer for measuring the temperature of said hydrogen storage and a second thermometer for measuring ambient temperature, and said detector detects the leakage of the hydrogen supplied from said hydrogen storage by comparing a temperature value measured by the first thermometer with that measured by the second thermometer.

13. A fuel cell system according to claim 5, wherein said detector stops power generation of the fuel cell at a predetermined timing and detects the leakage of the hydrogen by comparing a an open-circuit voltage value measured by the voltmeter with a predetermined voltage value.

14. A fuel cell system according to claim 6, wherein said detector stops power generation of the fuel cell at a predetermined timing and detects the leakage of the hydrogen by comparing a an open-circuit voltage value measured by the voltmeter with a predetermined voltage value.

15. A fuel cell system according to claim 7, wherein said detector stops power generation of the fuel cell at a predetermined timing and detects the leakage of the hydrogen by comparing a an open-circuit voltage value measured by the voltmeter with a predetermined voltage value.

16. A fuel cell system according to claim 8, wherein said detector stops power generation of the fuel cell at a predetermined timing and detects the leakage of the hydrogen by comparing a an open-circuit voltage value measured by the voltmeter with a predetermined voltage value.

* * * * *